(12) United States Patent
Modrzyk et al.

(10) Patent No.: US 12,339,855 B2
(45) Date of Patent: Jun. 24, 2025

(54) DATA STREAM PROCESSOR

(71) Applicant: Arm Limited, Cambridge (GB)

(72) Inventors: Damian Piotr Modrzyk, Katowice (PL); Metin Gokhan Ünal, Gamston (GB); Giacomo Gabrielli, Cambridge (GB); Balaji Venu, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/226,334

(22) Filed: Jul. 26, 2023

(65) Prior Publication Data

US 2025/0036632 A1 Jan. 30, 2025

(51) Int. Cl.
*G06F 16/00* (2019.01)
*G06F 16/2453* (2019.01)
*G06F 16/2455* (2019.01)

(52) U.S. Cl.
CPC .. *G06F 16/24568* (2019.01); *G06F 16/24542* (2019.01)

(58) Field of Classification Search
CPC ............ G06F 16/24568; G06F 16/24542
See application file for complete search history.

(56) References Cited

U.S. PATENT DOCUMENTS

| | | | |
|---|---|---|---|
| 7,885,320 B1* | 2/2011 | Groen | H04J 3/0685 375/376 |
| 10,454,496 B1* | 10/2019 | Prieditis | G06N 20/00 |
| 11,556,508 B1* | 1/2023 | Sundararajan | G06F 40/242 |
| 2005/0067492 A1* | 3/2005 | Amitay | G06Q 30/02 340/8.1 |
| 2015/0244804 A1* | 8/2015 | Warfield | H04L 49/90 709/219 |
| 2015/0360366 A1* | 12/2015 | Gupta | A63H 11/00 901/4 |
| 2017/0262389 A1* | 9/2017 | Raupp Da Rosa | G06F 13/28 |
| 2020/0162584 A1* | 5/2020 | Beckman | H04L 47/27 |
| 2021/0200749 A1* | 7/2021 | Sghiouer | G06F 16/215 |

\* cited by examiner

*Primary Examiner* — Dinku W Gebresenbet
(74) *Attorney, Agent, or Firm* — Leveque Intellectual Property Law, P.C.

(57) ABSTRACT

Provided is a data stream processor comprising a streamed data transceiver interface, a structure of processing units configurable to transform data received from a data source over the streamed data transceiver interface according to a specified output requirement, and a configuration unit operable in electronic communication with a data consumer to receive an output requirement and to configure the operation and linkage of a processing unit in the structure of processing units to transform input data to output data according to the specified output requirement; wherein the structure of processing units is further operable to provide the output data for output over the streamed data transceiver interface.

16 Claims, 5 Drawing Sheets

DATA STREAM PROCESSOR

FIELD OF THE INVENTION

The present technology is directed to the provision of a data stream processor configured on demand to transform input data to output data.

BACKGROUND

In typical SoC (System on Chip) architectures, system components such as audio codec, ISP (image signal processor), video codec, and display processor are integrated to the system with a classical memory mapped interconnect. Each system component with streaming input or streaming output stores and loads its data on the system using memory addresses allocated in memory (typically in dynamic random access memory-DRAM). This enables memory-to-memory processing entities such as CPU (Central Processing Unit) and GPU (Graphics Processing Units) to process the data asynchronously and without maintaining tight latency requirements, thereby increasing tolerance on overflow and underrun scenarios. One particular disadvantage of this architecture is that system components require memory round trips to retrieve data or to share data among themselves.

BRIEF DESCRIPTION OF THE DRAWINGS

Implementations of the present technology will now be described, by way of example only, with reference to the appended drawings, in which.

DETAILED DESCRIPTION

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

In an approach to addressing some difficulties in providing efficient, and possibly low power-consumption, input and output processing of streamed data such as sound, image or computer vision data, the present technology provides a data stream processor according to the appended claims.

In other approaches, there may be provided a method of operating a data stream processor according to the present technology, and that method may be realised in the form of a computer program operable to cause a computer system to perform the process of the present technology. As will be clear to one of skill in the art, a hybrid approach may also be taken, in which hardware logic, firmware and/or software may be used in any combination to implement the present technology.

Seen broadly, the present technology provides a data stream processor comprising a streamed data transceiver interface; a structure of processing units configurable on demand to transform data received from a data source over the streamed data transceiver interface according to a specified output requirement; and a configuration unit operable in electronic communication with a data consumer to receive an output requirement and to configure the structure and operations of processing units to transform input data to output data according to the specified output requirement; wherein the transform comprises a change in data format or content between input data and output data; and wherein the structure of processing units is further operable to provide the output data for output over the streamed data transceiver interface.

The data stream processor according to the present technology embodies a streaming processor architecture to address some of the shortcomings of memory mapped architectures by providing direct electronic communications between the various streamed data processing entities rather than relying upon memory fetches and stores.

In a data stream processor according to the present technology, a transform may comprise a change in data format between input data and output data. In some cases, the data content may be transformed. For example, transforming data may comprise filtering the data or converting data to a specified format, tiling data for n-dimensional tiled processing, synchronizing timing-sensitive data, and the like. To achieve the transforms required, the configuration unit is operable to configure an instance of the structure of processing units to operate sequentially or in parallel according to the requirements of the transform from input to output data. In some cases, providing the output data comprises providing the output data in a transformed format to a further structure of processing units configurable to process data received in the specified format. In one possible implementation, providing the output data may comprise providing the output data directly to a compression/decompression engine. In a further implementation, providing the output data may comprise providing the output data directly to a direct memory access controller.

Figure 1:
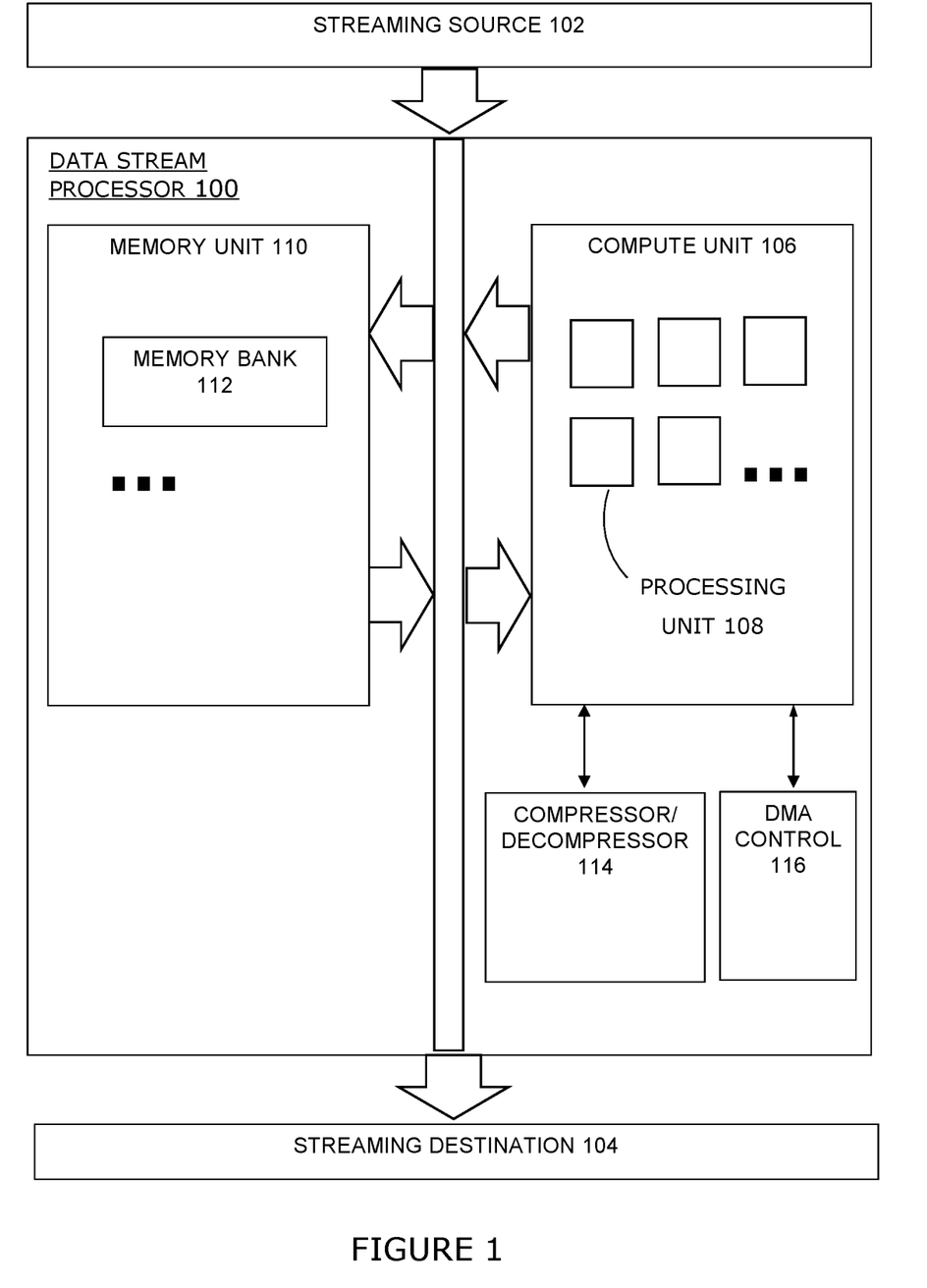
FIG. 1 shows a simplified example of a data stream processor according to an implementation of the present technology and comprising hardware, firmware, software or hybrid components.

Turning to FIG. 1, there is shown a simplified example of a data stream processor 100 according to an implementation of the present technology and comprising hardware, firmware, software or hybrid components. The data stream processor 100 is operable to be electronically coupled to a streaming source 102 to receive streamed data. Streamed data from streaming source 102 may be passed first to memory unit 110, which in turn comprises a plurality of memory banks 112 . . . , and/or the streaming input may be passed to compute unit 106 for processing to cause transformation of the data content and/or format. Processing within compute unit 106 is performed by a sequence or grid of processing units that are instructed to perform operations and linked to one another and/or to a streaming destination 104 according to configuration instructions. Compute unit 106 may make use of memory banks 112 in memory unit 110 for working storage of intermediate data, for the accumulation and buffering of final results before commencing output streaming, and the like. Data stream processor may comprise compressor/decompressor 114 and DMA control 116 arranged for additional handling of the data according to the data transform requirements.

Thus, in implementations, the data stream processor according to the present technology may comprise:
Streaming input/output interfaces,
An array of configurable processing units operable to transform data formats or contents
An optional compression codec to compress/decompress audio/image data
An optional DMA (Direct Memory Access) engine to provide system memory access.

The data stream processor according to the present technology has one or more streaming interfaces (e.g., AXIS-tream) that can be connected to external streaming interfaces such as; MiPi-CSI, MiPi-DSI, or I2S with an adapter.

Alternatively, the streaming interfaces can be connected to the system components that are processing data received from the above mentioned external interfaces such as an ISP, an audio codec and a display component.

Similarly, streaming processor interfaces can also be connected to the system elements that can accept or provide streaming data with a given format such as; video codecs, CNN (Convolutional Neural Network) accelerators or DMA (Direct Memory Access) engines.

The data stream processor according to the present technology comprises a memory unit and a compute unit, which in turn comprises a sequence or grid of processing units interconnected with the streaming interfaces. Processing units process the incoming streaming data and forward the output to either to another processing unit, a compression/decompression block, a DMA engine, or a streaming output component. Data stream processing devices according to the present technology can either process the streaming data as a pre/post processing operation or can also be used for restructuring of data, such as image tiling for more efficient compression or serialisation on the tiled images.

Figure 2:
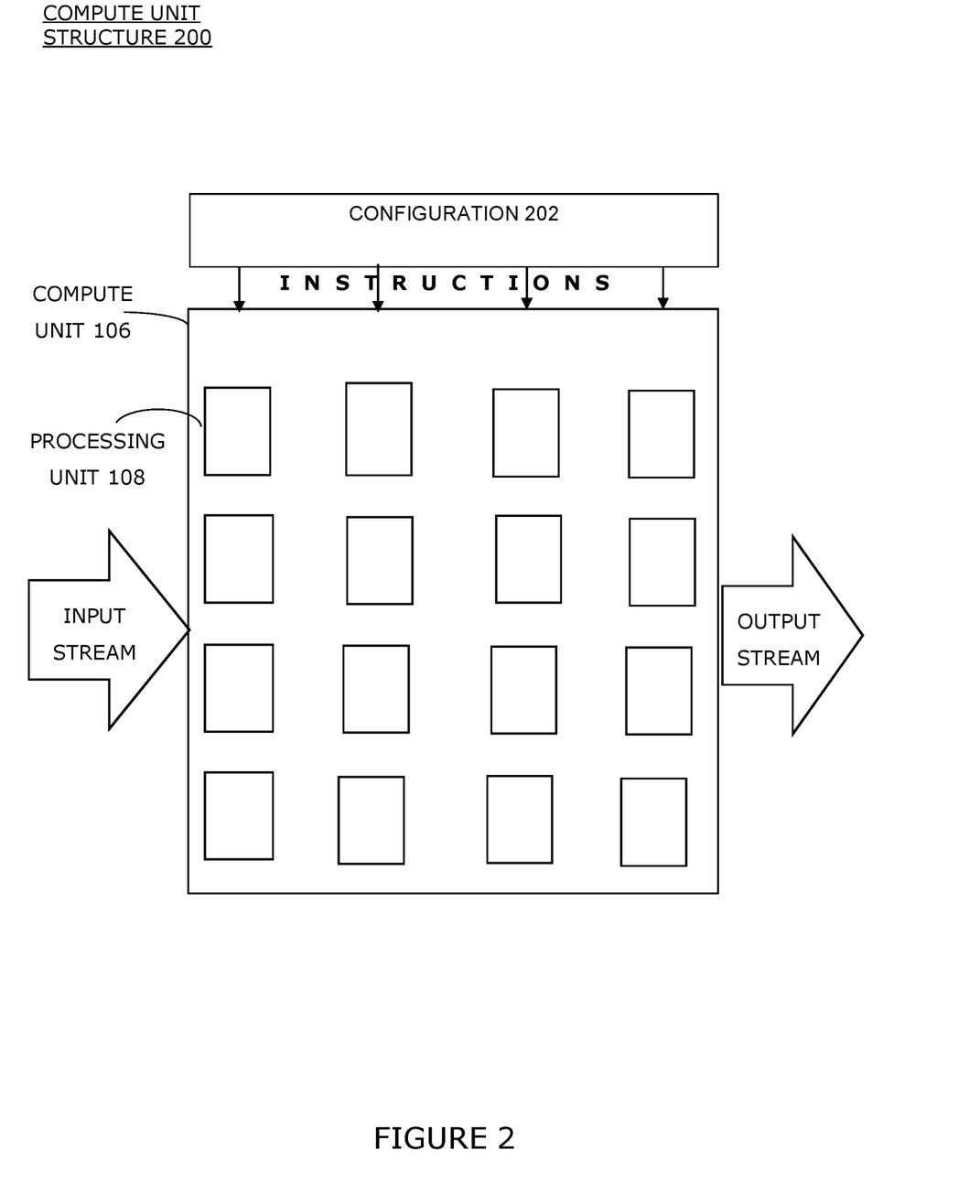
FIG. 2 shows a possible structure for a compute unit according to an implementation of the present technology.

Turning now to FIG. 2, there is shown a possible compute unit structure 200 according to an implementation of the present technology. A compute unit 106 is arranged to be operable in electronic communication with an input stream to receive input data, and with an output stream to provide output to other components, such as further compute units, DMA engines, and the like. The compute unit 106 comprises a sequence or array of processing units 108 that are configured as to their operations and interconnections according to instructions from configuration 202. The processing units 108 are instructed to perform operations and can be linked to form a sequence or grid with one another and/or can be linked to the output stream-all these according to configuration instructions received or fetched from configuration 202. Configuration 202 may comprise a portion of a memory or one or more registers for storing configuration instructions.

As briefly mentioned above, there may be provided a compression codec block (compressor/decompressor 114 of FIG. 1) arranged in electronic communication with compute unit 106. The compression codec block receives uncompressed data as an input stream and then compresses the data stream and stores the data on allocated buffers. On decompression, the compression codec block reads the compressed data from allocated buffers and sends the uncompressed data via streaming interfaces to the target processing entity or interface.

In another implementation, there may be provided a DMA engine (DMA control 116 of FIG. 1) arranged in electronic communication with compute unit 106. The DMA engine provides access to the system memory, transforming streaming data packets to memory transactions and vice versa.

For CPU processing, the DMA engine can transfer cache lines to the target CPU cores' private caches or to the DSU (DynamIQ Shared Unit) L3 Cache or to MCN (Memory Controller Node) System Level Cache (SLC). Similarly, for GPU processing the DMA Engine can store a compressed, tiled image data to the SLC, allowing the GPU to access the streaming data in compressed format.

The data stream processor has a coarse-grained configurable compute unit and a multi-banked memory controller for controlling local memory.

Streamed inputs can be directed to the memory unit to buffer incoming streaming data for operations that require this treatment, such as stencil processing (e.g., filtering) or transpose/format conversion (e.g., packed to planar, visa-versa). Alternatively, streaming input can be passed directly to the compute unit for data processing for operations like colour-space conversion, resize, edge-detection, optical flow etc. Results of the operations on the incoming stream can then be sent out from the output streaming interface.

In this way, it will be immediately apparent to one of skill in the art that the present technology is well-adapted to handling types of data that arrive as input streams, such as real-time camera image data, audio data and the like. In streamed data processing tasks, such as image processing and computer vision tasks, it is frequently necessary to perform sequences or arrangements of instructions in a patterned or correlated manner-one example of this type of processing is stencil processing.

Stencil processing operations are a widely-used type of data processing operations in which fixed patterns can be applied repetitively to subsets of sets of data (for example, using a sliding window pattern for acquiring the data to be processed), and typically involving some dependencies among the data elements of the subsets and/or correlations among the operations to be executed at each instance of the stencil's application. Stencil operations are well-adapted to take advantage of spatial and temporal locality in data, and can provide advantages in efficiency of processing and in economy of resource consumption, by, for example, reducing the number of memory accesses required to perform a process that features repetitions and correlations.

A typical example of a processing entity that is capable of performing repetitive or patterned arithmetical/logical operations on data is a Graphics Processing Unit (GPU). Conventional GPUs were designed for the specific purpose of processing inputs in the form of, typically, annotated mathematical (usually vector) representations of images, extracting geometrical forms and their positions from those representations, manipulating and interpreting annotations describing characteristics of elements in the images (such as colour and texture), and providing outputs suitable for controlling the rasterization of a final output image to display buffers ready for display on an output device, such as a display screen or a printer. In performing these functions, GPUs frequently operated in a single instruction, multiple e data (SIMD) mode to perform repetitive arithmetical/logical operations on data.

In conventional GPUs, there are sub-units providing the various functions required for the computational processing of graphics, the sub-units having access to a dedicated memory subsystem and also typically having one or more caches used for input and output buffering and for intermediate data storage during processing and usually providing data load and store operations. The units providing these functions are typically operable in parallel processing pipelines to handle the often very large amounts of data that need to be processed.

Because GPUs are characterised by their ability to process very large sets of data, using massive parallelism, at the very high speeds needed for detailed rendition of still or video graphics on screens, developers have observed that they are also well adapted to other uses, such as processing the very large statistical data sets needed for scientific, medical and pharmacological data analysis and for artificial intelligence inferencing.

It is thus now known in the art to use GPUs to perform other functions—for example, it is known to exploit the built-in parallel processing capabilities of GPUS to perform non-graphics-related computations, such as computations on statistical data sets or machine-learning neural network tensor data. The parallel processing capabilities of GPUs make possible the concept of the general purpose GPU (or GPGPU), operable alongside conventional CPUs to take on some workload that is in need of such parallel processing capabilities. This is typically achieved by using special purpose software that is adapted to exploit the strengths of GPU hardware for these non-graphics-related functions.

Recently, developers have realised that it is also possible to exploit the parallel processing power of GPUs to perform visual data processing, such as image processing, by enabling the sub-units to perform the computations required to process the computer vision or image data, under control of specialised software.

The type of streamed data processing, such as image or sound processing, envisioned here is the processing of input data from a camera, microphone or other streaming data capture device to prepare the data (typically using data manipulations such as image or sound data simplification, normalization and transformation) for computational operations such as image recognition, and this clearly differs from the conventional use of GPUs. The recently developed arrangements for using GPU functionality under specialised software control for these non-conventional tasks has several drawbacks, however. Among these is the attempt to achieve fast and efficient operation of complex computational tasks on non-frame-oriented data with the continued use of memory store-fetch for intermediate "scratchpad" purposes—this is a limitation in the repurposing of unmodified GPU-type processors where the adaptation is located in software. The present technology, in its various implementations, is arranged to address this and other limitations of the known art.

There is thus provided a streamed data processor that is capable of handling high-volume streamed data that requires manipulation involving complex computation, and which is also susceptible to implementation using the functionality of a GPU-type processing architecture in a new and fundamentally different manner.

The routing fabric of the data stream processor uses protocol signals for packet routing—the signals can be configured statically for an epoch (i.e., an image/video frame) or can be routed dynamically.

For an AXIStream implementation, protocol signals can be used as follows:
TID for identifying the data stream, operation, source of the stream
TDEST: for the destination of the data stream
TDATA: for the image/audio/meta data For multicast packets, the router can generate copies of packets with the destination TDEST adjusted accordingly.

Some applications of the data stream processor according to the present technology can be:
Frame buffer compression/decompression/scaling for non-streaming processing entities (e.g., CPU, GPU)
ISP pre/post processing
Streaming data compression
Data synchronisation and transmission between ISP/Audio/Video codecs for real-time video capture.
Data synchronisation and transmission between video codec and display processor for video playback.

The data stream processor according to the present technology exploits the configurability of the processing units, both in terms of the combinations of primitives that they can use to perform higher-level operations, and in their capacity to be configured in varying linkage patterns to perform sequential or parallel operations on the input data to implement a wide variety of transforms both on the structure of the data and on its content.

The processing units of the present technology are particularly well-adapted to perform a limited set of primitive processing operators from which any higher-level operators may be constructed as required, thereby forming a hardware/firmware/software stack implementation of a processing architecture arranged according to the following rules:
R1. An operator shall be a primitive operation or building block that cannot be decomposed into simpler whole visual operations;
R2. An operator shall be reusable as a component out of which more complex operations can be constructed;
R3. Precision should be appropriate for the input and output data types (as high as needed, but not wastefully higher);
R4. Numerical definition of common sub-operations should be consistent between operators (for example: image feature scaling);
R5. The valid input and output ranges for all operands shall be specified; and
R6. Integer operators shall be implementable in a bit-exact form with good efficiency. on CPU, GPU and hardware targets.

The processing architecture defines a set of primitive operators according to the rules to which higher level operators can be consistently reduced—the present technology provides a base upon which such an architecture can advantageously be implemented.

Figure 3:
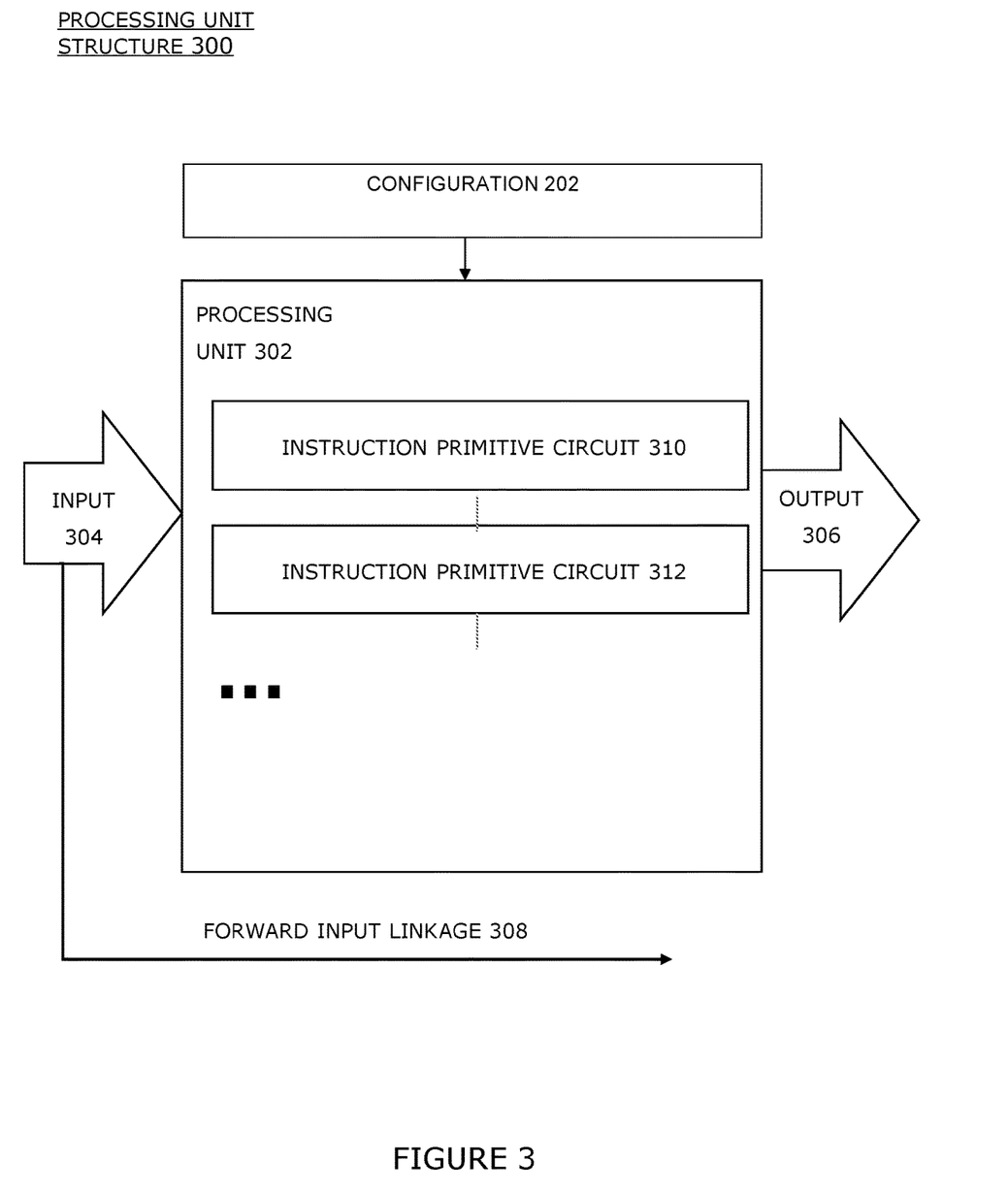
FIG. 3 shows possible structure for a processing unit according to an implementation of the present technology.

Each of the processing units in a compute unit according to the present technology is specifically adapted to perform data processing on at least a portion of a data stream according to the primitive operator or combination of operators for a received configuration instruction. There is shown in FIG. 3 a processing unit structure 300 according to implementations of the present technology. The structure comprises a configurable processing unit 302 operable in electronic communication with other entities to receive input (which may be from a wholly external entity, or may be from another peer processing unit according to the arrangement of the processing units within a compute unit). Processing unit 302 comprises an input 304, an output 306 and a forward input linkage 308, for those cases in which the input is to be received at this processing unit and also forwarded in its current state to a further processing unit 302. Processing unit 302 is arranged in electronic communication with configuration 202 (each processing unit 302 may be provided with a portion of configuration 202 of FIG. 2, in, for example, a configuration register) to accept configuration instructions that cause processing unit 302 to perform operations and to establish linkages to other entities as instructed. Processing unit 302 comprises instruction primitive circuits 310, 312 . . . that are operable to accept configuration instructions, for example to assemble themselves into higher-level instructions, and to perform operations on input data.

By providing a structure in which sets of processing units designed to perform these primitive operators can be reconfigured in various sequential and parallel structures to perform their operations on visual or image data, the present technology advantageously exploits the performance and efficiency characteristics of GPU-type architectures. Within a compute unit, the processing units can pass data directly to one another in various arrangements of linkages or they can pass data via a memory in a memory unit. In one arrangement, the data can pass as a continuous stream through an array of processing units to be subjected to sequences of operations as instructed by the configuration instructions. In another arrangement, the compute unit may have its processing units operating in parallel, for example in a single instruction, multiple data (SIMD) mode of operation. In yet another arrangement, the compute unit may have its processing units operating in various stencil modes, to perform stencil-type operations (operations in which an action on one element of a data set are conditioned by operations on neighbouring or related elements of the data set). In yet a further arrangement, the compute unit may have its processing units configured to perform a hybrid of arrangements of operation types, for example, by varying the linkages by row, column or n-dimensional subset.

Figure 4:
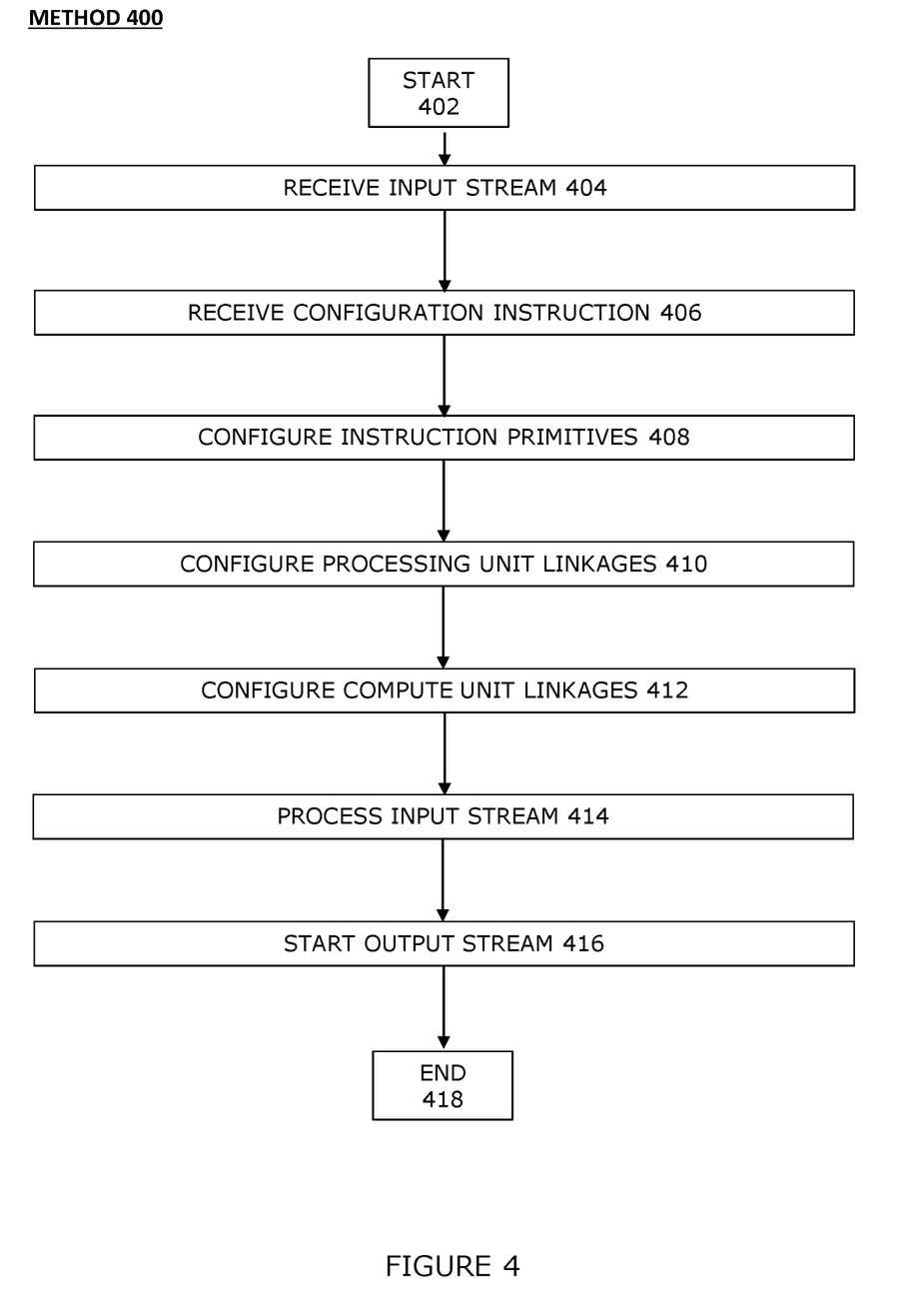
FIG. 4 shows a possible sequential operation method for controlling an apparatus according to the present technology.

A simplified example of a method 400 of operation of a compute unit (106 of FIG. 1) within a data stream processor (100 of FIG. 1) is shown in FIG. 4, starting at START 402. At 404, the compute unit (106 of FIG. 1) receives at least a portion of an input data stream, and at 406, also receives a configuration instruction. At 408, the instruction primitives in the processing units (102 of FIG. 1) are configured to perform the required transformations on the input data, and at 410, the linkages between the processing units are configured. Optionally, if scalability beyond what can be supplied by a single compute unit's processing units is required, at 412, linkages between compute units are configured to create a higher-level chain. Configuration of the instruction primitives, processing unit linkages and compute unit linkages being complete, at 414, the input stream is processed. At 416, the output stream is started, and this iteration of the process completes at END 418. As will be immediately clear to one of skill in the art, the process is shown as one iteration only, and in any real-world use case, the method may recommence at 402 for further iterations.

Additional configurability and scale can be achieved at the level of the compute units by arranging the external linkages between compute units to form chains, thereby increasing the number of processing units that can be brought to bear on the input data stream.

Figure 5:
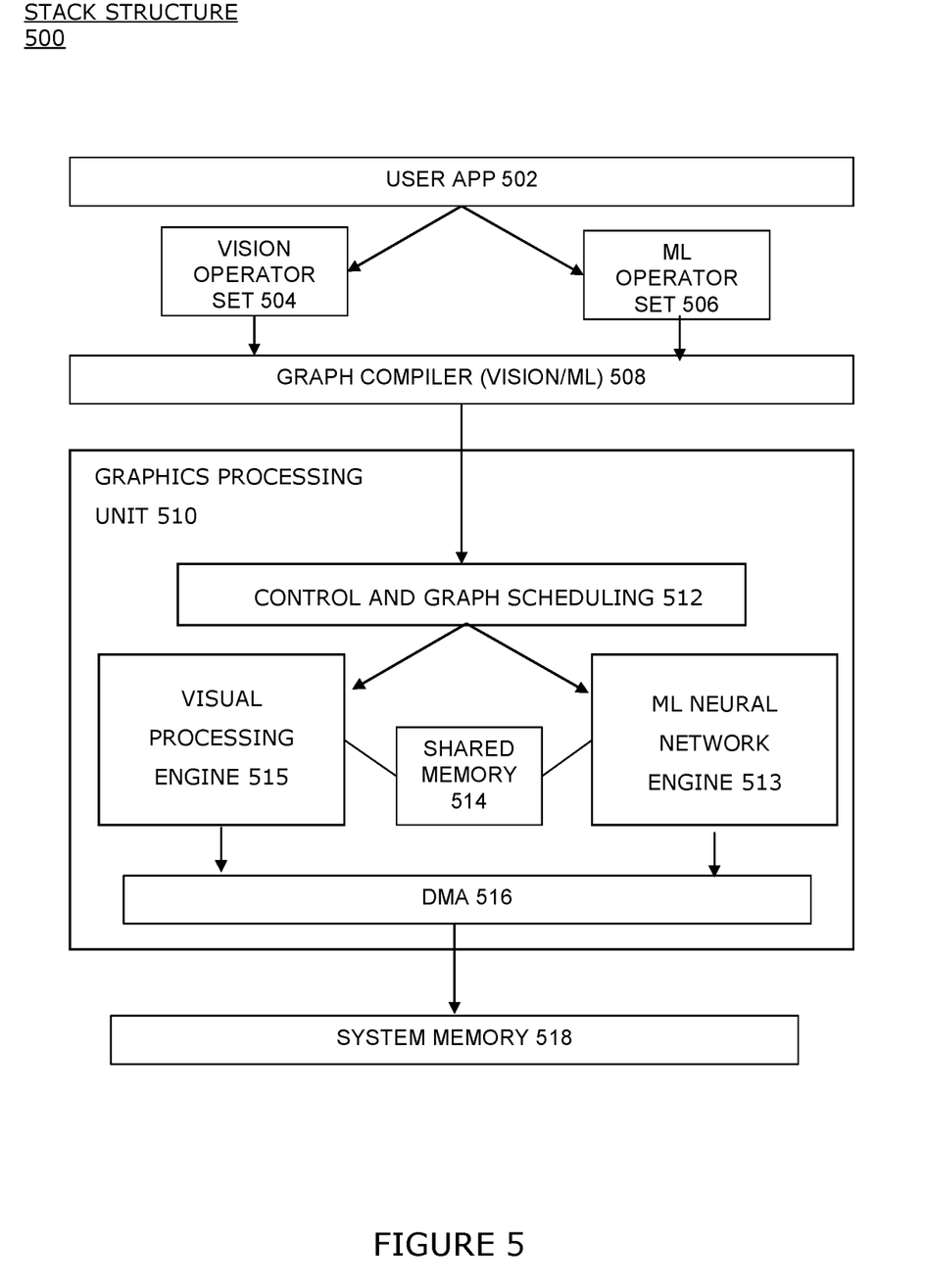
FIG. 5 shows an example of a stack structure comprising hardware, firmware and/or software into which the data stream processor of the present technology may be incorporated.

The present technology may be incorporated into a pipeline arrangement (typically implemented in a GPU) that is operable to perform both visual processing and machine learning neural network processing. For example, there may be provided a stack structure 500 as shown in FIG. 5 having tightly-coupled and highly-programmable visual processing and neural network accelerator components, as well as a unified, common control and graph-oriented scheduling layer.

Stack structure 500 may comprise software, firmware and hardware elements including user applications 502 that may incorporate program operators from a vision operator set 504—instructions based on primitives specifically tailored for performing operations on visual data—and operators from a machine learning operator set 506—instructions based on primitives specifically tailored for performing operations on machine learning data, typically tensor data. The user application 502 is processed at least in part by the graph compiler 508, which is adapted to compile both vision operators from 504 and machine learning operators from 506 into a unified program processing graph. Graph compiler 508 is arranged in at least intermittent electronic communication with graphics processing unit 510 to provide compiled graph data to control and graph scheduling component 512, which controls and schedules the activities of visual processing engine 515 and machine learning (ML) neural network engine 513. Visual processing engine 515 and machine learning (ML) neural network engine 513 are operable to make use of shared memory 514 (which may comprise on-chip SRAM memory resources) for local memory operations, and to provide data as required via DMA component 516 to system memory 518.

There is thus provided in this embodiment a single centralised point of control in the control and graph scheduling component 512 which fetches the command stream for the visual processing engine 515 and the ML neural network 513 and controls overall processing and data-flow for the compute stages, as defined by the output of the graph compiler.

Graph-based programming (software) model for both ML and non-ML parts of the vision pipeline, thanks to Vision Processor Graph Compiler incorporating graph-based vision pipeline abstractions leveraging specifically-designed visual processing instruction set architecture and a specifically-designed machine learning tensor-based instruction set intermediate representations.

In this way, the present technology may achieve improved energy efficiency by way of end-to-end visual and machine-learning pipeline scheduling optimised for keeping data on-chip and maximizing utilisation of available hardware resources. This efficiency may combine with improved performance by also avoiding Remote Procedure Calls (RPC) between the host CPU and the visual processing engine. The present technology may further benefit from a reduction in chip area due to increased sharing of the hardware resources in the form of common control, SRAM and DMA resources.

As will be appreciated by one skilled in the art, the present techniques may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments. Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed.

The present technology further provides processor control code to implement the above-described systems and methods, for example on a general purpose computer system or on a digital signal processor (DSP). Furthermore, the present technique may take the form of a computer program product tangibly embodied in a non-transitory computer readable medium having computer readable program code embodied thereon. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored using fixed carrier media.

In one alternative, an embodiment of the present techniques may be realized in the form of a computer implemented method of deploying a service comprising steps of deploying computer program code operable to, when deployed into a computer infrastructure or network and executed thereon, cause the computer system or network to perform all the steps of the method.

In a further alternative, an embodiment of the present technique may be realized in the form of a data carrier having functional data thereon, the functional data comprising functional computer data structures to, when loaded into a computer system or network and operated upon thereby, enable the computer system to perform all the steps of the method.

It will be clear to one skilled in the art that many improvements and modifications can be made to the foregoing exemplary embodiments without departing from the scope of the present disclosure.

The invention claimed is:

1. A data stream processor comprising:
a streamed data transceiver interface;
a structure of processing units configurable to transform data received from a data source over the streamed data transceiver interface according to a specified output requirement; and
a configuration unit operable in electronic communication with a data consumer to receive the specified output requirement and to configure operation and linkage of a processing unit in the structure of processing units to transform input data to output data according to the specified output requirement, where the configuration unit is operable to configure an instance of the structure of processing units to operate in one or more linkage configurations, including one or more of sequential, parallel and stencil;
wherein the structure of processing units is further operable to provide the output data for output over the streamed data transceiver interface; and
wherein the processing unit comprises a plurality of instruction primitive circuits operable to combine to perform at least one higher-level instruction.

2. The data stream processor according to claim 1, wherein the transform comprises a change in data content between input data and output data.

3. The data stream processor according to claim 1, wherein the transform comprises a change in data format between input data and output data.

4. The data stream processor according to claim 1, wherein the transform comprises filtering the data.

5. The data stream processor according to claim 1, wherein the transform comprises converting data to a specified format.

6. The data stream processor according to claim 1, wherein the transform comprises tiling data for n-dimensional tiled processing.

7. The data stream processor according to claim 1, wherein the transform comprises synchronizing timing-sensitive data.

8. The data stream processor according to claim 7, wherein providing the output data comprises providing the output data to a further structure of processing units configurable to process data received in the specified format.

9. The data stream processor according to claim 1, wherein providing the output data comprises providing the output data by a direct data-passing interface to a compression/decompression engine.

10. The data stream processor according to claim 1, wherein providing the output data comprises providing the output data by a direct data-passing interface to a direct memory access controller.

11. A method of operating a data stream processor comprising:
  receiving streamed data over a streamed data transceiver interface;
  transforming input data received from a data source over the streamed data transceiver interface to output data, using a processing unit in a structure of processing units according to a specified output requirement; and
  receiving, by a configuration unit operable in electronic communication with a data consumer, the specified output requirement and configuring operation and linkage of a processing unit in the structure of processing units to transform input data to output data according to the specified output requirement, where the configuration unit is operable to configure an instance of the structure of processing units to operate in one or more linkage configurations, including one or more of sequential, parallel and stencil; and
  providing the output data from the structure of processing units for output over the streamed data transceiver interface,
  wherein using the processing unit in the structure of processing units includes using a plurality of instruction primitive circuits operable to combine to perform at least one higher-level instruction.

12. The method according to claim 11, wherein the transform comprises a change in data content.

13. The method according to claim 11, wherein the transform comprises a change in data format.

14. The method according to claim 11, wherein providing the output data comprises providing the output data by a direct data-passing interface to a compression/decompression engine.

15. The method according to claim 11, wherein providing the output data comprises providing the output data by a direct data-passing interface to a direct memory access controller.

16. A computer program product stored on a non-transitory storage medium and comprising program code to cause a computer system to:
  receive streamed data over a streamed data transceiver interface;
  transform input data received from a data source over the streamed data transceiver interface to output data, using a processing unit in a structure of processing units according to a specified output requirement;
  receive, by a configuration unit operable in electronic communication with a data consumer, the specified output requirement and configuring operation and linkage of a processing unit in the structure of processing units to transform input data to output data according to the specified output requirement, where the configuration unit is operable to configure an instance of the structure of processing units to operate in one or more linkage configurations, including one or more of sequential, parallel and stencil; and
  provide the output data from the structure of processing units for output over the streamed data transceiver interface,
  wherein using the processing unit in the structure of processing units comprises using a plurality of instruction primitive circuits operable to combine to perform at least one higher-level instruction.

* * * * *